INVENTORS.
HERBERT G. HANSON
WALTER E. DRAXLER
BY
ATT'Y.

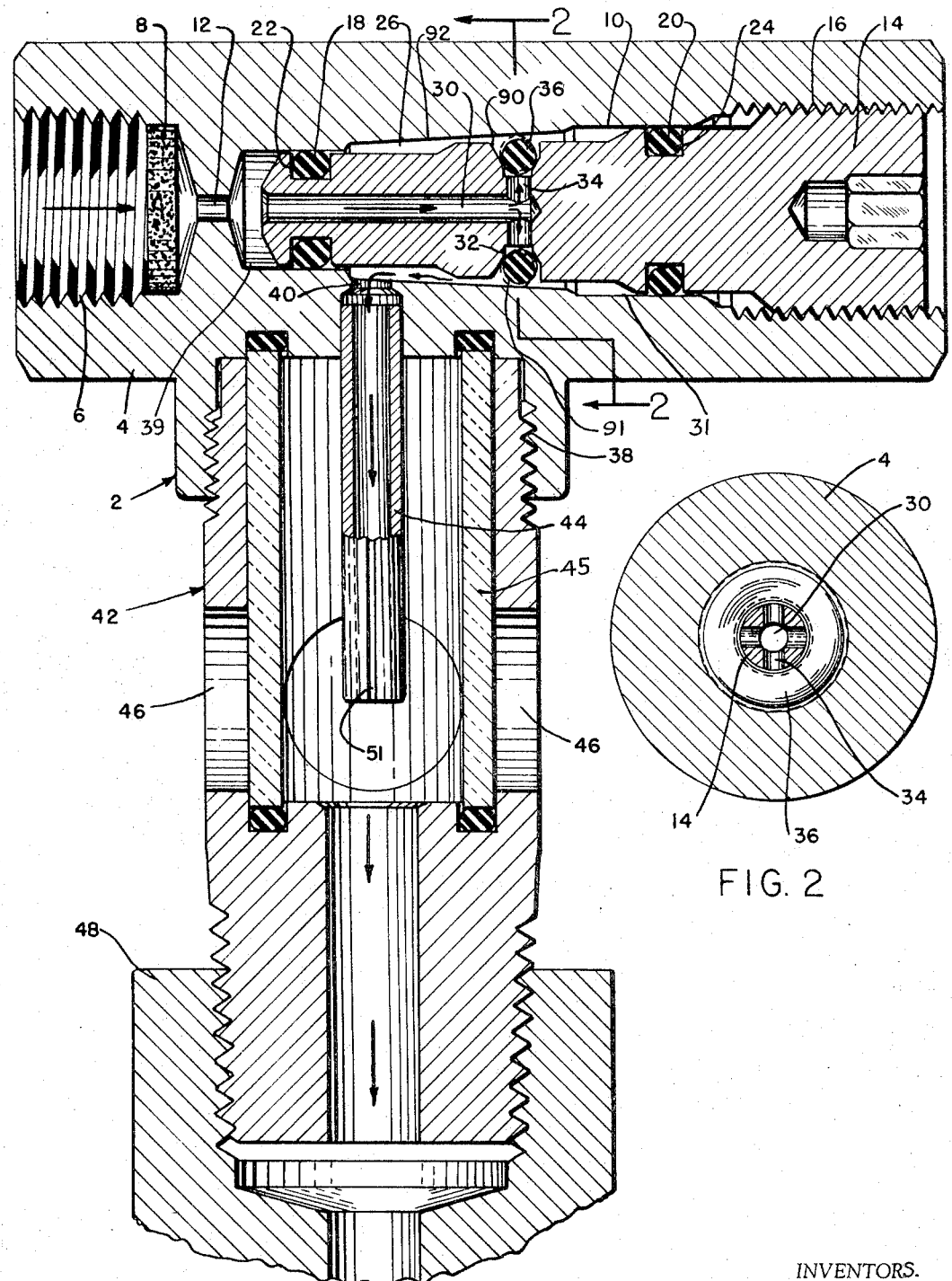

United States Patent Office 3,297,106
Patented Jan. 10, 1967

3,297,106
PULSATING LUBRICATOR
Herbert G. Hanson and Walter E. Draxler, Arlington Heights, Ill., assignors to The Bastian-Blessing Company, Chicago, Ill., a corporation of Illinois
Filed Mar. 23, 1964, Ser. No. 353,952
4 Claims. (Cl. 184—7)

This invention relates to lubricating devices for use in supplying supplemental lubrication to intermittently operated motors powered by a fluid such as compressed air.

Air motors are generally powered from compressed air supply lines that have an oil mist or fog injected into them by a lubricator having an oil reservoir located where it is convenient for refilling. The air flowing through the line from the lubricator to the motors is relied upon to convey the oil mist to each air motor and quite often the location of the lubricators are substantial distances from one or more air motors served by the air line.

In those instances where the air motors operate continuously for long periods of time the oil mist is sufficiently suspended in the air in its movement to reach and maintain adequate lubrication of the air motors but where the air in the airline flows intermittently as where intermittently operated motors are driven thereby, the entrained lubricant may fall out of the air in the airline during "off" periods, or fall out in certain portions of the airline, and one or more air motors can be deprived of adequate lubricant. In fact, under some circumstances, a particular motor may receive no lubrication at all on an intermittently stagnant branch of an airline even though all of the continuously running motors are receiving a satisfactory amount of lubricant through a continuous flow of air thereto.

This deficiency and the associated danger of damage to an air motor is directly related to the amount of lubricant needed by an air driven tool, the length of time between motor operations, the shortness of time each motor is in operation, and the distance the air may have to travel between the air control valve and the motor controlled thereby. Since the conventional lubricator is installed upstream of the valve, much of the oil supplied to the airline can be separated out in the control valve and exhausted to atmosphere. It should be noted that the conventional lubricators are designed for unidirectional air flows and do not operate satisfactorily when placed downstream of the valve. This in turn is the requirement that this pulse lubricator particularly fills. Also in many instances oil that passes through the valve merely moves back and forth between the control valve and tool. For example, where a length of piping separates the air motor from its control valve or the motor is a short stroke motor the valved air required to operate the motor may not be enough to ultimately displace the lubricant starved air from the piping or if the exhaust is in the valve the well lubricated air may not reach the air motor before the starved air ahead of it blows the well lubricated air back and out through the valve exhaust. In these dangerous situations a false indication is given at the exhaust port of adequate lubrication being present. Actually the only air that might be reaching the air motor is a churning body of lubricant starved air repeatedly entering and leaving the air motor. Thus, if the ratio of piping volume to motor work volume for a given working pressure is too great then no satisfactory amount of lubricant bearing air ever reaches the air motor.

To assure proper lubrication of air motors in all of these instances it is desirable to provide a supplemental lubricator which can be installed downstream of the valve to discharge oil at the air entry port of the tool or at the working interfaces of the tool. It is also desirable to provide the supplemental lubricator with an independently adjustable oil delivery control because too much oil causes flooding and sluggish operation. It is further desirable to supply the supplemental oil from the main lubricator, thus avoiding the cost of a supplemental reservoir or a changing of the frequency of maintenance that might be required if more oil reservoirs are added that have to be checked and filled.

It is also desirable to have the auxiliary lubricator mounted on or near the air motor so that oil is immediately available and does not have to work its way down a tube as if it were remotely located.

Although supplemental lubricant can be supplied to the air motor each time it is reversed or turned "off" so that the oil will be immediately distributed with incoming air on the next cycle, it is preferred that oil be supplied with the inflow of air at the start of a cycle and particularly where and when an air pressure drop occurs that will assist introduction of the oil. An economical way is to utilize the pressure drop occurring on one side of an air motor as it is reciprocated and injecting an adjustably metered amount of oil each time the control valve cycles.

Furthermore, for standardization it is desirable that the supplemental lubricator be interchangeable to either inject lubricant directly into the working members of the motor or supply lubricant to the air stream immediately ahead of its entrance into the motor.

It is, therefore, a primary object of this invention to provide an improved supplemental lubricator to supply lubricant intermittently to a selected part of an air motor system in direct relationship with its use and a positive adjustably measured amount each time.

Another object is to provide a supplemental lubricator which may be used in conjunction with a conventional air line lubricator to receive a supply of oil therefrom and be controlled by a pressure drop in the airline to supply oil remotely to the air motor causing the pressure drop without being a burden upon the main lubricator and upon the oil received under pressure therefrom.

A further object of the invention is to provide a lubricator directly related to pressure change at the air motor without intermittent operation of other motors on the same airline being affected thereby or affecting the lubrication of the motors.

Yet another object is to provide a lubricator which can be installed alternately as desired at the air motor and be supplied with lubricant under pressure from a remote point or at the lubricator and be connected to a remote air motor without any alterations structurally inside the lubricator or air motor.

A further object is to provide an improved pulse lubricator which will operate upon a pressure differential created between a remote source of lubricant under pressure and the selected part of the air motor system.

Another object is to provide a lubricator in which the flow of lubricant to a selected part of an air motor system is quickly adjustable with respect particularly to the length of the stroke of the metering device.

The invention is also characterized by the oil being free to flow around the control element in either direction while the control element is in movement.

The invention is further characterized by an operation which provides a predetermined amount of lubricant during each operation of an intermittent air motor independently of the duration of each operation whereby lubricated air in the air line can take over the lubrication of the air motor when the duration is long enough for adequately lubricated air in the airline to reach the air motor.

Still another object is to provide a lubricator which is economical to manufacture, simple to operate and requires a minimum of maintenance or repair.

Further objects and advantages of this invention will be apparent from the accompanying specification and drawings in which:

FIG. 1 is a vertical sectioned view of a pulse lubricator embodying the invention;

FIG. 2 is a cross-sectional view taken upon line 2—2 in FIG. 1 illustrating the movement of the O-ring with equal and unequal pressures;

Figure 5:
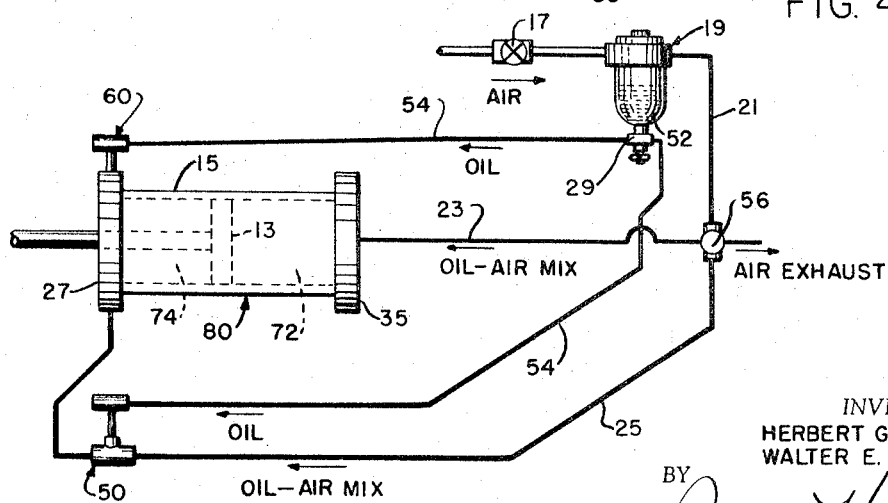
FIG. 5 is a schematic view of an air motor system showing pulse lubricators embodying the invention being utilized in various positions in the systems.

Referring to the air motor system shown in FIG. 5 an intermittently operated air motor is shown at 80 having a piston 13 reciprocally mounted in a cylinder 15 as supplied with air pressure alternately on opposite sides thereof by a directional or four-way valve 56. The air pressure is supplied from a compressor (not shown) through a main shut-off valve 17 to a lubricator 19 constructed as shown in co-pending application Serial No. 272,991 now abandoned where an oil mist from the oil reservoir 52 is picked up by the air in its movement. The lubricated air is conveyed from the lubricator through the airline 21 to the control valve 56 which is connected by conduit 23 to the head 35 of the air motor and by conduit 25 to the other end 27 of the cylinder 15. Operation of the valve 56 directs lubricated air under pressure to the air motor 80 while exhausting air from the other side through the other one of the conduits.

Devices embodying the invention are shown at 50 and 60 as pulse lubricators connected by conduits 54 to a fitting manifold 29 that is mounted on the lubricator 19 at the bottom of the reservoir. Both or either one of the devices may be used as desired. Device 60 is connected to discharge supplemental lubricant through conduit 54 directly to the moving parts of the air motor whereas device 50 discharges into the airline 25 near its connection to the air motor. In both instances the connections are made where there will be a drop in the air pressure when same is exhausted from the air motor after a working application thereof to the motor.

Referring to the embodiment of the invention shown in FIG. 1, a single resilient element constitutes the sole moving element for supplying a metered amount of oil to an air motor each time the air motor is actuated. In brief, an O-ring 36 is radially expanded from one sealing position to follow along a conical wall along with the quick flow of oil induced by a sudden drop of air pressure to move into another sealing position. After radial expansion a predetermined distance the O-ring engages another wall and closes the annular space between the two walls to terminate the flow of oil therethrough. Thereafter the O-ring resiliently returns to its resting position when pressures on opposite sides thereof again equalize.

The O-ring is made of an elastomer material impervious to oil and is mounted in a deep groove 32 on an adjustable plug member 14. The groove 32 is in communication with the nose of the plug member through radial cross bores 34 intersecting an axial bore 30 that opens on the end face of the plug. The plug is received in the axial bore 10 of an elongated housing 4 in adjustable relationship at the threaded engagement 16 therebetween.

The bore 10 into which the plug is received comprises two axially spaced cylindrical portions 31 and 39 of different diameters with a frusto-conical surface 92 therebetween encompassing the O-ring 36. The outer bore 31 is the larger one and is in communication with the air motor. The inner bore 39 is the smaller one and encompasses the nose of the plug 14 and is disposed in communication with a threaded inlet 6 in the housing 4 to receive oil under pressure from the lubricator reservoir 52 and conduit 54 through a mechanical filter 8 preferably of sintered metal at the bottom of the inlet 6 and a small diameter passageway 12, as shown in FIG. 1.

The plug and housing are provided with axially slidable seals in the bore comprising O-rings 18 and 20 carried in axially spaced annular grooves 22 and 24 and engaging the cylindrical walls 39 and 31 respectively. The O-rings 18 and 20 isolate the groove 32 and the frusto-conical surface 92 in sealed relationship to define a sealed chamber 26 and to permit the adjustment of the plug 14 for locating the O-ring 36 at any axial depth in the frusto-conical surface 92. The chamber 26 is provided with a radially disposed port 40 which receives a rolled pin type tube 44 which will be described shortly.

It will be noted that the groove 32, as shown, has a frusto-conical surface 90. This surface is radially inclined to the frusto-conical surface 92 of the body 4 and defines an annular passage 91 therebetwen which communicates with the outlet 40 through chamber 26. The O-ring 36 is of a radial size just small enough to contact the sides of its groove 32 in a relationship sealing off the counter bores 34 from the chamber 26. Then when the presure at the outlet 40 drops below the lubricant pressure effective in the cross bores 34, the lubricant under the pressure differential resulting will expand the O-ring 36 towards the frusto-conical surface 92 and same will move outwardly along the conical surface 90 with the flow of lubricant through the passage 91 until it contacts the surface 92 and seals off further flow. In the meantime an increment of lubricant has passed through the passage 91 to lubricate the air motor.

Depending on how quickly the air pressure drops at the port 40 and how great the drop is each time, the pulsing of the oil is constant for a given set of conditions and a fixed amount is delivered each time. This can be varied by varying the excursion distance of the O-ring 36 to the frusto-conical surface 92. If it is short, less oil will be metered, if it is increased, more oil will be metered each time. This distance is controlled by adjustment of the depth at which the O-ring is positioned in the surface 92 by rotating the plug at its threaded engagement 16.

The pulse lubricator will function in either or both positions indicated by the numerals 50 and 60 because there is substantial air pressure drop in both places. In either place the following will occur as further explanation of the operation of the system shown in FIG. 5. When valve 17 is opened air under pressure flows through the lubricator 19 and the airline 21 to the valve 56. In the lubricator 19 this air pressure is effective on the oil reservoir 52 and oil will be forced therefrom through conduits 54 to the pulse lubricators 50 and 60. They can be initially primed by momentary loosening of the plug 14 until the O-ring seal 18 is clear of the bore 39 so as to place passage 12 in direct communication with outlet port 40. Oil will then fill the oil passages including the chamber 26. The plug is then returned to its working position and adjusted. Thereafter air pressure applied through valve 56 will be effective at the outlet port 40 to balance the oil line pressure and the O-ring 36 will close passages 34. Thus, the flow of oil under reservoir pressure, through the pulse lubricator is normally blocked by the O-ring 36. Then when the valve 56 is operated to apply pressure to chamber 72 of the air motor and exhaust the air under pressure in chamber 74 the pressure that is effective at the outlet port 40 quickly drops. When the pressure at outlet 40 drops, the O-ring 36 is radially expanded under the reservoir oil pressure allowing oil to flow from passage 34 into chamber 26.

However, this flow is only momentary because the flow of the oil under pressure differential causes O-ring 36 to seat and seal against the tapered wall 92 of counterbore 10 and the conical surface 90 of groove 32 as shown by the broken lines in FIGS. 1 and 2. The air motor having performed its work stroke, the valve 56 is returned to resting position to induce the reverse stroke and equalization of pressures is restored at outlet port 40. This permits the O-ring 36 to return to its seated position in groove 32.

Each pressure drop, therefore, causes a pulsing action of O-ring 36 to move an increment of oil through the lubricator. The amount of lubricant which will flow with each pulse can be regulated by adjusting the radial length of travel of the O-ring. This is acomplished by moving plug 14 in or out of bore 10. It will be observed that the O-ring has different effective pressure responsive areas in its two alternate positions. The effective area facing the oil in the groove in the resting position is less than the effective area facing the oil in chamber 26 in its expanded position. This provides a snap action on opening and colsing. Thereby crisp and prompt response are assured.

This pulsating action of the lubricator causes the lubricant to exit at outlet port 40 on the feed portion of the cycle. This port 40 leads from the annular chamber 26 to a sight feed assembly 42 that has a rolled pin type tube 44 mounted in it which terminates in a sight glass 45 opposite window openings 46 for oil drop viewing. Thereby correct operation and adjustment of the lubricator can be verified by sight. The rolled pin type tube provides a slot down its side at 51 that radially vents sudden pressures and any sudden application of hydraulic pressure to the oil in the tube is relieved laterally without a splash or spurt occurring at the end.

The sight feed assembly 42 has a threaded end piece 48 which can be attached in the air line 25 immediately adjacent to the air motor or directly to the air motor. FIG. 5 shows the oil being injected into the air line at 50 and directly into the air motor at 60.

Figure 3:
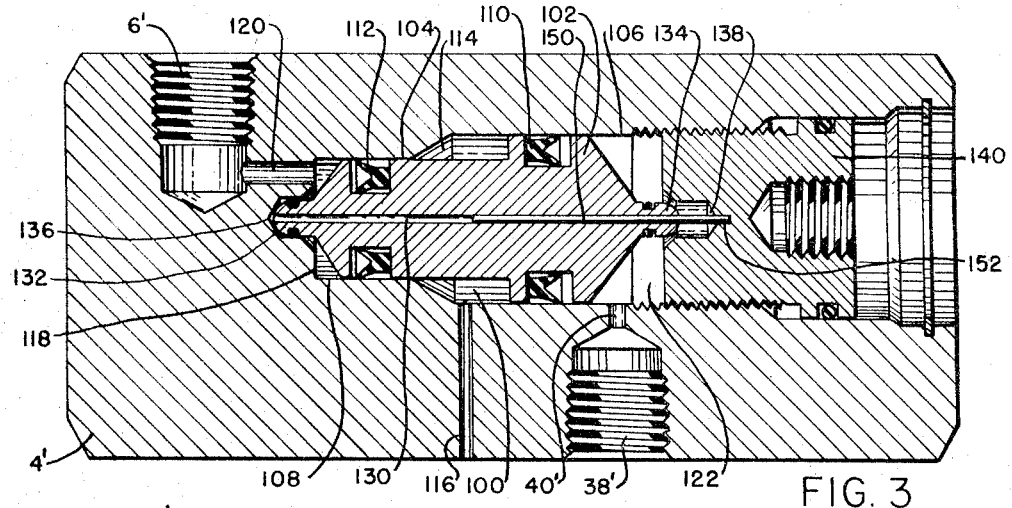
FIG. 3 is a vertical sectioned view of a further embodiment of the invention with the parts thereof disposed in resting position as when the air and oil pressures are equalized.
Figure 4:
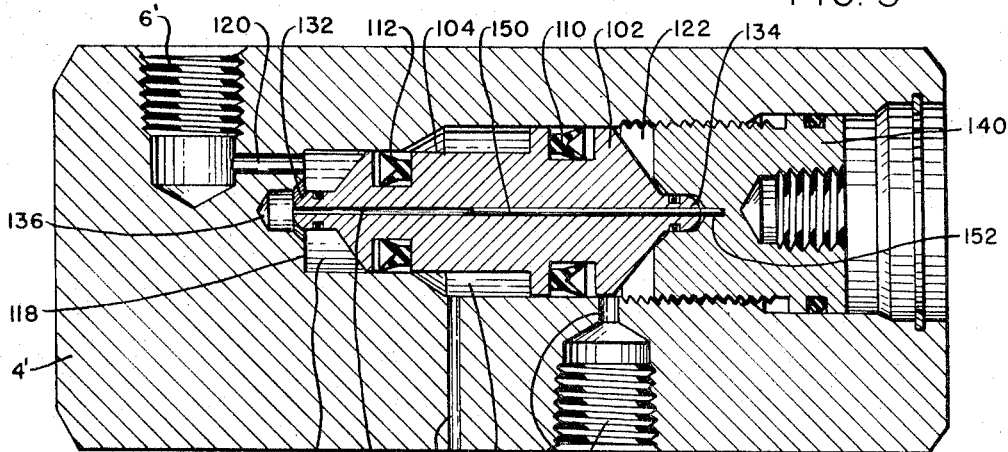
FIG. 4 is a vertical sectioned view of the lubricator in FIG. 3 in a relationship involving unequalized pressures.

Referring now to FIGS. 3 and 4, a modified construction is shown wherein the O-ring 36 is replaced as a single functioning member by a spool piston member 100 carrying two O-rings which perform similar functions. Member 100 has an enlarged piston area 102 on one end and a reduced area 104 at the other end. Body 4' has a corresponding large bore 106 and a reduced bore 108 reciprocably receiving the member 100 in sealed relationship by sealing rings 110 and 112 which form therewith three chambers. The central chamber 114 is vented to the atmosphere through a passage 116 which intersects the bore 106. The smaller chamber 118 communicates with inlet port 6' and conduit 54 through passage 120 and the larger chamber 122 is connected to the outlet passage 40'. In its resting position member 100 is disposed as shown in FIG. 3 as when the air and oil pressures are equalized and the large effective area 102 of member 100 facing chamber 122 is in command. This extra effective area assures this position of the member 100 because both being in opposition are only working against the same or atmospheric pressure present in chamber 114. However, when an air pressure drop occurs at the outlet 38', as previously described in connection with the operation of control valve 56, the member 100 is urged into the position shown in FIG. 4 by the then dominating pressure of oil in chamber 118. Operation of the valve 56 thus produces a shuttling action for the member 100.

This shuttling action of the member is utilized to inject supplemental increments of lubricant through passage 130 and flow cut off dash pot type valve members 132 and 134 to the air motor 80. Plunger valve members 132 and 134 are of the same effective area and are, respectively, received alternately in bores 136 and 138 which are spaced a distance greater than the distance between members 132 and 134. However, bore 138 is formed in an adjustable plug member 140 which can be moved in and out of bore 106 to regulate the length of travel of member 100 before flow cut-off occurs but the plunger member clears its bore before the other plunger engages its bore thereby providing a quick pumping action and a controlled recovery.

Lubricant entering the lubricator under pressure at 6' as previously described flows through passage 120 and into chamber 118. Plunger member 132 in FIG. 3 being disposed in its cylinder 136 prevents the lubricant from entering passage 130. However, when a pressure drop at the outlet 40' occurs valve member 100 moves to its alternate position shown in FIG. 4. In so doing, both bores 134 and 136 are open simultaneously for a moment and lubricant momentarily passes from chamber 118 to chamber 122 through passage 130 until it is cut off by the plunger member 134 sealing in bore 138 as shown in FIG. 4.

The amount of lubricant passing through passage 130 during the movement of member 100 can be adjusted by the relative size of a metering pin 150 and by limiting the travel of member 100 through adjusting plug 140. The member 150 is also placed in the passage 130 and suitably attached to plug 140 at 152 so that movement of member 100, in cooperation with pin 150, acts to prevent fine particles from blocking the passage 130.

As in the previous construction sight feed assembly 42 can be attached to the lubricator at 38' and the lubricator then inserted into either positions 50 or 60 shown in FIG. 5.

Having thus described our invention in several embodiments, we wish to be protected by Letters Patent to the full extent of the appended claims.

What is claimed is:

1. A lubricating device including a body having an inlet, an outlet and a passage therebetween, said inlet communicating with a source of lubricant under pressure in a fluid pressure system, said outlet communicating with another portion of said system to be lubricated subjected to a varying pressure, means positioned in said passage and movable with the flow of lubricant through said passage to close said outlet, said movable means normally closing said inlet to terminate the flow when the pressures at said inlet and outlet are substantially equal, said movable means moving with the flow through the passage away from said inlet to close said outlet and prevent flow of lubricant through said passage when the pressures at said inlet and outlet are not equal, said movable means comprising an O-ring of an elastomer material which radially expands and contracts when moving from one flow preventing position to another, and conduit means to allow flow of predetermined increments of lubricant from said inlet to said outlet while said movable means is moving between said inlet and outlet in both directions.

2. In a fluid pressure system a lubricator having a body with an inlet port, an outlet port and a passage between the ports, said inlet port communicating with a source of lubricant under constant pressure, said outlet port communicating with a portion of said system subjected to a varying pressure, means to pass a measured amount of lubricant from said inlet port to said outlet port including a resilient radially expandable annular movable means free to move in said passageway alternately movable to seal one of the two ports and unseal the other port, said movable means having an unstressed size less than that of the passageway to permit said measured amount of lubricant to pulse flow while said movable means is moving between said ports and being normally closing on one port by its own resiliency under substantially equal pressures at the inlet and outlet ports and urged by unequal pressures at the inlet and outlet ports to seal on the other port, adjusting means in said passageway to vary the distance between said ports including an element moving one of said ports in said passageway.

3. In a device of the class described having an air pressure supply line for air powered motors and including a lubricator for the air line having a lubricant reservoir subjected to the air pressure, the combination of a control valve for applying and exhausting air pressure from a portion of the supply line connected to an air motor, a body having an oil inlet port connected to said reservoir for receiving oil therefrom under substantially constant pressure and an outlet port subjected to the pressure present in said supply line portion, said body having an elongated compartment interconnecting said ports including a circular wall portion in communication with one of said ports, means in said compartment sealing said inlet from said outlet including an element having a passage therethrough interconnecting the inlet and outlet ports and having a second circular wall portion around one end of said passage, said element being disposed in said first circular portion and having means for adjustably moving it in said compartment for varying the distance between said ports and including an O-ring radially expandable in said compartment between said ports to permit oil to flow from said inlet port to said outlet port during said movement.

4. A pulse lubricator for use in an air motor system including a body having an inlet port connected to a source of lubricant under pressure in said system, an outlet port in said lubricator body in communication with said system at a point adjacent to an air motor, said body having conduit means including a tapered bore portion interconnecting said inlet port and said outlet port, an adjustable means disposed in said conduit means for axial movement in said tapered bore, said adjustable element means carrying an O-ring in a groove thereon, said adjustable element means including passageway connecting said inlet port with said groove, said O-ring acting to seal off said passageway from communication with said outlet port when said inlet and outlet pressures are substantially equal, said O-ring expanding radially to a second seated position against said tapered bore portion in said conduit means when said outlet pressure is less than said inlet pressure, said radial expansion acting to allow a predetermined amount of lubricant to move from said inlet port toward said outlet port while said O-ring is moving from one seated position to the other, and means for adjusting said adjustable element to reduce the radial expansion of said O-ring in said conduit means thereby reducing the amount of lubricant which moves toward said outlet port upon each radial expansion of said O-ring.

References Cited by the Examiner
UNITED STATES PATENTS

| | | | |
|---|---|---|---|
| 1,099,242 | 6/1914 | Emery | 184—55 |
| 1,994,173 | 3/1935 | Farmer. | |
| 2,243,074 | 5/1941 | Anderson. | |
| 2,703,558 | 3/1955 | Wilcox | 137—525 X |
| 2,864,464 | 12/1958 | Booth. | |
| 3,056,423 | 10/1962 | Lieser | 137—525 X |

LAVERNE D. GEIGER, *Primary Examiner.*

E. J. EARLS, *Assistant Examiner.*